United States Patent
Boursier (10) Patent No.: US 9,724,854 B2
(45) Date of Patent: Aug. 8, 2017

(54) PREFORMS MADE DIRECTLY FROM THERMOSETTING COMPOSITE CHIPS

(71) Applicant: Hexcel Corporation, Dublin, CA (US)

(72) Inventor: Bruno Boursier, Dublin, CA (US)

(73) Assignee: Hexcel Composites Limited, Cambridge (GB)

( * ) Notice: Subject to any disclaimer, the term of this patent is extended or adjusted under 35 U.S.C. 154(b) by 233 days.

(21) Appl. No.: 14/711,087

(22) Filed: May 13, 2015

(65) Prior Publication Data

US 2016/0332339 A1    Nov. 17, 2016

(51) Int. Cl.
B29C 43/02    (2006.01)
B29B 11/16    (2006.01)

(52) U.S. Cl.
CPC ............. *B29C 43/02* (2013.01); *B29B 11/16* (2013.01)

(58) Field of Classification Search
None
See application file for complete search history.

(56) References Cited

U.S. PATENT DOCUMENTS

| 3,389,427 | A * | 6/1968 | Reyburn ................. B29B 11/12 264/319 |
|---|---|---|---|
| 7,510,390 | B2 | 3/2009 | Callis |
| 7,960,674 | B2 | 6/2011 | Boursier et al. |
| 8,366,046 | B2 | 2/2013 | Boursier et al. |
| 8,709,319 | B2 | 4/2014 | Gideon et al. |
| 8,709,321 | B2 | 4/2014 | Gideon et al. |
| 2011/0111172 | A1 | 5/2011 | Gideon et al. |
| 2012/0040169 | A1 | 2/2012 | Boursier |
| 2013/0022391 | A1 | 1/2013 | Fisher, Jr. et al. |
| 2013/0101406 | A1 | 4/2013 | Kweder et al. |
| 2013/0126073 | A1 | 5/2013 | Kenney |
| 2014/0159274 | A1 | 6/2014 | Gideon et al. |
| 2016/0346958 | A1 * | 12/2016 | Steele .................... B29C 70/38 |

FOREIGN PATENT DOCUMENTS

| EP | 415436 A1 | 3/1991 |
|---|---|---|
| EP | 916477 A1 | 5/1999 |
| EP | 1134314 A1 | 9/2001 |
| EP | 2179838 A1 | 4/2010 |
| EP | 1988118 B1 | 4/2013 |
| FR | 2740149 A1 | 4/1997 |
| WO | 2010/010584 A1 | 1/2010 |

OTHER PUBLICATIONS

PCT International Search Report for PCT/2016/028035—Jul. 18, 2016.

* cited by examiner

*Primary Examiner* — Mary F Theisen
(74) *Attorney, Agent, or Firm* — W. Mark Bielawski; David J. Oldenkamp (57) ABSTRACT

Preforms for use in molding composite parts are made directly from composite chips that are composed of fibers and an uncured thermosetting resin. Cold composite chips are formed into a stream of non-agglomerating chips that is used to fill the cavity of a preform tool. The non-agglomerating chips flow into the preform tool cavity to form a population of non-cohesive composite chips. The non-cohesive composite chips are then heated to form a preform made up of a consolidated population of cohesive composite chips in which the non-sticky uncured thermosetting resin of the non-cohesive chips has been converted to a sticky uncured thermosetting resin.

16 Claims, 2 Drawing Sheets

PREFORMS MADE DIRECTLY FROM THERMOSETTING COMPOSITE CHIPS

BACKGROUND OF THE INVENTION

1. Field of the Invention

The present mention relates generally to the field of compression molding using molding materials that are composed of composite chips that contain unidirectional fibers and a tacky then resin matrix. More particularly, the invention provides an alternative to the type of compression molding process where the inherent tackiness of the composite chips is used to form a self-cohesive sheet of molding material that is cut and/or folded to form a self-cohesive free-standing body which is commonly known as a "preform". Typically, multiple plies of the sheet molding material are used in making a single preform. The preform, which has a shape that matches the final shape of the desired part, is cured in a compression mold to form the final product.

2. Description of Related Art

Pre-impregnated composite material (prepreg) is used widely in the manufacture of composite parts and structures. Prepreg is a combination of uncured resin matrix and fiber reinforcement that is ready for shaping and curing into the final composite part. By pre-impregnating the fiber reinforcement with resin, the manufacturer can carefully control the amount and location of resin that is impregnated into the fiber network and ensure that the resin is distributed in the network as desired.

Unidirectional (UD) tape is a common form of prepreg. The fibers in unidirectional tape are continuous fibers that extend parallel to each other. The fibers are typically in the form of bundles of numerous individual fibers or filaments that are referred to as "tows". The unidirectional fibers are impregnated with a carefully controlled amount of uncured resin. The UD prepreg is typically placed between protective layers to form the final UD tape that is rolled up for storage or transport to the manufacturing facility. The width of UD tape typically ranges from less than one inch (2.5 cm) to a foot (30.5 cm) or more.

Unidirectional tape is not well-suited for use as a molding compound for forming complex three dimensional structures using compression molding techniques. The parallel orientation and continuous nature of the fibers in the UD tape cause fiber bunching or bridging when the UD tape is forced to fit the features of the complex part. As a result, the manufacture of complex three dimensional parts using UD tape has been limited to a laborious process where individual plies of UD tape are applied directly to a three dimensional mold, which is subsequently processed in an autoclave or other molding apparatus. This lay-up procedure using UD tape tends to be a long and costly process.

Molding compounds, which are generically referred to as discontinuous fiber composite (DFC) molding compound, have been found to be suitable for compression molding complex parts. One type of DFC molding compound is composed of random segments of individual chopped fibers that are combined with a thermosetting resin matrix. The randomly oriented chopped fibers more easily fit the features of a complex three dimensional part. However, the movement of the random fibers during high-pressure molding can vary unpredictably from one molded part to the next and may also differ between different features of a given part.

Another type of DFC molding compound, which is referred to herein as DFC sheet molding compound, combines the attributes of UD tape and randomly oriented short fibers into a single molding compound that can be accurately molded and machined to form a wide variety of relatively complex structures. DFC sheet molding compound is composed of randomly oriented segments or chips of unidirectional tape that have been impregnated with a tacky thermosetting resin. This type of quasi-isotropic DFC sheet molding compound was first used to make a variety of aerospace components. DFC sheet molding compound has also been a popular molding material for use in making the high strength molds that are used to compression mold the composite parts.

DFC sheet molding compound is available from Hexcel Corporation (Dublin, Calif.) under the trade name HexMC®. Examples of DFC sheet molding compound and the types of parts that have been made using sheet molding compound are described in U.S. Pat. Nos. 8,366,046; 7,510,390; 7,960,674 and published US Patent Application Nos. US2012-0040169-A1 and US2013-0101406, the contents of which are hereby incorporated by reference.

DFC sheet molding compound is typically made by laying multi-filamentary tows (yarns) parallel to each other on a suitable backing and impregnating the parallel tows with uncured thermosetting resin to form a UD prepreg. The UD prepreg is then chopped to form UD chips which are generally from 2 mm to 25 mm wide and from 25 mm to 125 mm long. The UD chips are then made into the DFC sheet molding compound, which is in the form of a layer of quasi-isotropically oriented UD chips. Typical thicknesses for a layer of DFC sheet molding compound range from 0.4 mm to 2 mm.

The inherent tackiness of the uncured thermosetting resin in the DFC sheet molding compound makes it possible to fold and manipulate one or more layers of the DFC sheet molding compound to form a complex three dimensional preform that is then compression molded to form the final composite part. The type of parts that are now being made using DFC sheet molding compound has expanded into a wide range of applications outside of the aerospace and mold making industries. Parts made by compression molding preforms composed of DFC sheet molding compound are now found in automobiles, motorcycles, bicycles and a wide range of other applications.

SUMMARY OF THE INVENTION

In accordance with the present invention, it was discovered that a useful preform can be made directly from chips of UD prepreg rather than following the accepted practice of forming preforms from pre-existing DFC sheet molding compound. Preforms formed directly from UD prepreg chips provide a number of advantages over preforms made using DFC sheet molding compound. For example, various portions of the DFC sheet molding compound are cut away and discarded in order to make two dimensional patterns that are combined to form the three dimensional preform. This waste of DFC sheet molding compound is eliminated when the preform is formed directly from chips of UD prepreg in accordance with the invention. This is an important consideration in mass production situations, such as automobile manufacturing.

A further advantage of the present invention is that the overlapping of various layers of DFC sheet molding compound, which may be necessary for some preforms, is also eliminated by directly forming the entire preform from chips of UD prepreg in accordance with the present invention. Additionally, the thickness of a preform made using DFC sheet molding compound is dependent upon the combined thicknesses of the various sheets molding compound.

Accordingly, it may be necessary to use various combinations of DFC sheet molding compounds having different thicknesses in order to achieve a desired preform thickness. This need to match the thicknesses of the DFC sheet molding compound to the desired thickness of the preform is eliminated When the preform is formed directly from chips of UD prepreg in accordance with the invention. This is particularly advantageous in forming preforms which include complex surface geometries that are formed by frequent changes in preform thickness.

The present invention is based on a method for making a preform composed of a consolidated population of cohesive composite chips wherein the preform includes at least one exterior surface which forms the surface of a composite oil upon molding of the preform. The method includes the initial step of providing non-agglomerating composite chips which each include fibers and an uncured thermosetting resin wherein the non-agglomerating composite chips are at a temperature such that the tackiness of the uncured thermosetting resin is sufficiently low to prevent agglomeration of the composite chips.

As a feature of the invention, a stream of the non-agglomerating composite chips is formed and directed into a preform tool that includes walls which form a cavity for receiving the stream of non-agglomerating composite chips. The non-agglomerating composite chips form a population of non-cohesive composite chips inside the preform tool cavity. At least one of the walls of the preform tool cavity defines the exterior surface of the preform.

Once the cavity of the preform tool is filled with the population of non-cohesive composite chips, the temperature of the non-cohesive composite chips is increased to form a preform that is composed of a consolidated population of cohesive composite chips in which the cohesive composite chips each includes fibers and the uncured thermosetting resin. The temperature of the cohesive composite chips is such that the tackiness of the uncured thermosetting resin is sufficiently high to cause cohesion of the cohesive composite chips to form the preform.

The next step in accordance with the invention involves simply removing the preform from the preform tool. The preform can then be stored for molding at a later time or immediately compression molded in the same manner as preforms made using DFC sheet molding compound. Advantageously, preforms made in accordance with the invention are made without wasting any molding material and there are no internal ply boundaries which typically are found in preforms made using DFC sheet molding compound. Internal ply boundaries were found to he weaker than the interface between chips within the DFC sheet when tested out of plane. In addition, there are no overlapping layers of DFC sheet molding compound that also affect the part properties.

The above described and many other features and attendant advantages of the present invention will become better understood by reference to the following detailed description when taken in conjunction with the accompanying drawings.

DETAILED DESCRIPTION OF THE INVENTION

The present invention involves the use of composite chips in a method for directly forming preforms from the composite chips. The composite chips that are used as the feed material are the same or similar to the type of UD chips typically used to make DFC sheet molding compound. Such UD chips contain UD fiber tows and an uncured thermosetting resin as the matrix. Any of the UD chips that are suitable for use in making DFC sheet molding compound, such as HexMC®, may also be used as the composite chips that are directly made into a preform using the method of the present invention.

Figure 1:
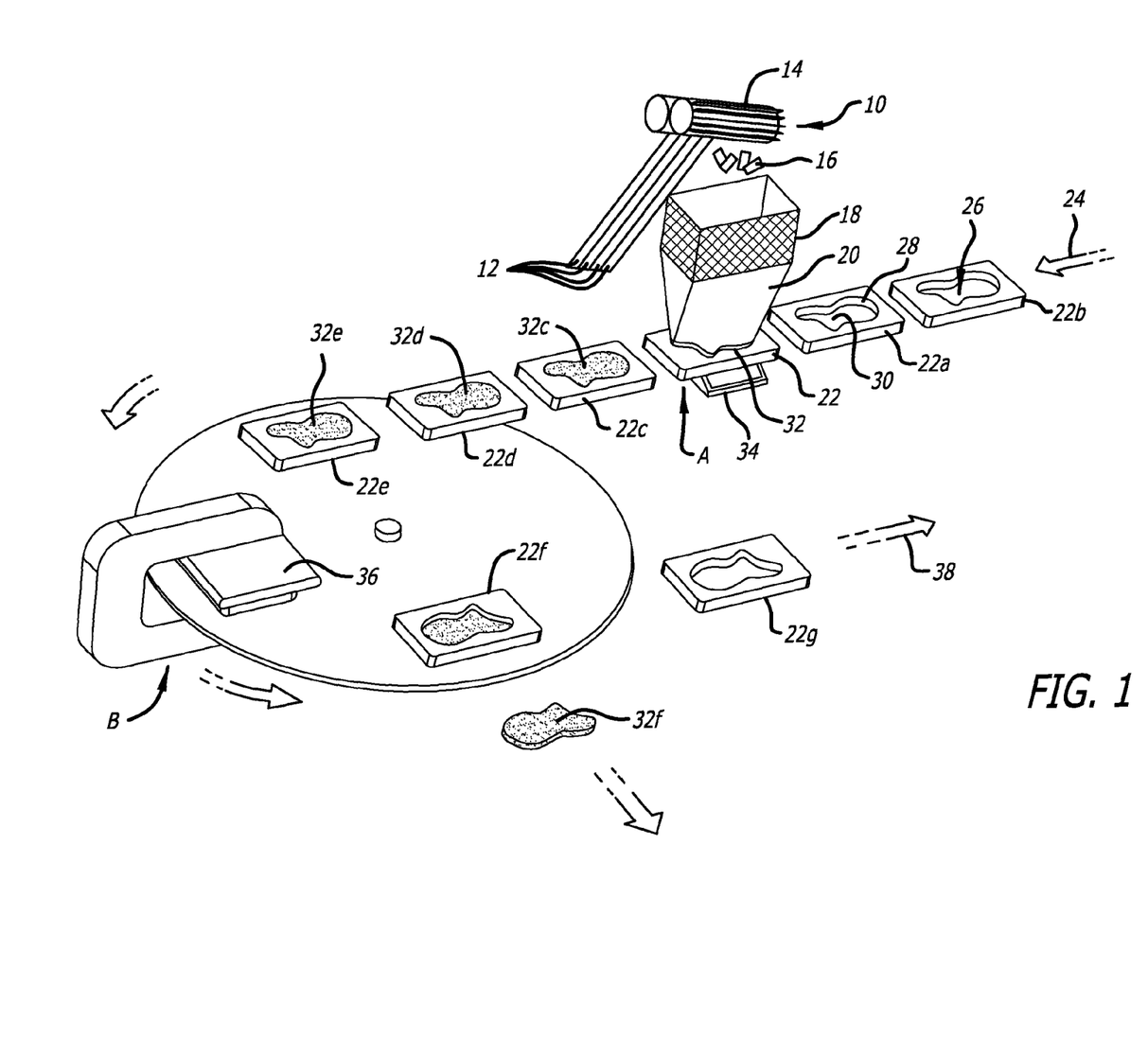
FIG. 1 is a schematic representation of an exemplary method in accordance with the present invention.

An exemplary method is set forth in FIG. 1. The initial step 10 involves making non-agglomerating composite chips 16. The non-agglomerating composite chips 16 each includes fibers and an uncured thermosetting resin. The non-agglomerating composite chips 16 are kept at a temperature such that the tackiness of the uncured thermosetting resin is sufficiently low to prevent agglomeration of the composite chips. As shown at 10, multiple parallel UD tapes 12, which are formed by slitting a sheet of UD fibers, are fed to cutters 14. The temperature of the UD tapes 12 is also sufficiently low that the uncured resin is not tacky. The cutters 14 chop the tack-free UD tape 12 into multiple non-agglomerating composite chips 16. The uncured thermosetting resin in the non-agglomerating composite chips 16 remains tack-free provided that the temperature is kept at or below the tack-free temperature ($T_{tf}$) of the resin. Heating of the uncured resin to a temperature above $T_{tf}$ causes the uncured resin to become tacky and results in agglomeration of the chips.

It is preferred that that the UD tape 12 be kept at temperatures below $T_{tf}$ during chopping to form the non-agglomerating chips in order to eliminate problems associated with chopping tape containing tacky resin. However, if desired, it is possible to chop the tape 12 into chips at temperatures above $T_{tf}$ and then cool the chips to below $T_{tf}$ in order to form the non-agglomerating composite chips 16.

The fibers used to make the UD tape may be any of the fibers that are typically combined with thermosetting resins to form molding compounds or preforms. For example, the fibers may be carbon, glass, aramid or ceramic. The preferred fibers are carbon tows that are arranged unidirectionally in the UD tape 12. Carbon fiber tows are commercially available, for example, from Hexcel Corporation (Dublin, Calif.) under the trade name HexTow®. The following are exemplary types of HexTow® that may be used to make the UD tape: AS2C 3K is a 3,000 filament carbon fiber tow weighing 0.200 g/m and having a density of 1.80 g/cm$^3$; 2) AS4 3K is a 3,000 filament carbon fiber tow weighing 0.210 g/m and having a density of 1.79 gm$^3$; 3) AS4 6K is a 6,000 filament carbon fiber tow weighing 0.427 g/m and having a density of 1.79 g/cm$^3$; 4) AS4 carbon 12K is a 12,000 filament carbon fiber tow weighing 0.858 g/m and having a density of 1.79 gm$^3$; 5) AS4C 3K is a 3,000 filament carbon fiber tow weighing 0.200 g/m and having a density of 1.78 g/cm$^3$; 6) AS4C 6K is a 6,000 filament carbon fiber tow weighing 0.400 g/m and having a density of 1.78 gm$^3$; 7) AS4C 12K is a 12,000 filament carbon fiber tow weighing 0.800 g/m and having a density of 1.80 g/cm$^3$: 8) AS4D 12K is a 12,000 filament carbon fiber tow weighing, 0.765 g/m and having a density of 1.79 gm$^3$; 9) AS7 12K is a 12,000 filament carbon fiber tow weighing 0.800 g/m and having a density of 1.80 g/m$^3$; 10) IM2A 6K is a 6,000 filament carbon fiber tow weighing 0.223 g/m and having a density of 1.78 gm$^3$; 11) IM2A 12K is a 12,000 filament carbon fiber tow weighing 0.446 g/m and having a density of 1.78 g/cm$^3$; 12) IM2C 12K is a 12,000 filament carbon fiber tow weighing 0.446 g/m and having a density of 1.78 gm$^3$; 13) IM6 12K is a 12,000 filament carbon fiber tow weighing 0.446 g/m and having a density of 1.78 g/cm$^3$; 14) IM7 6K is a 6,000 filament carbon fiber tow weighing 0.223 g/m and having a density of 1.78 gm$^3$; 15) IM7 12K is a 12,000 filament carbon fiber tow weighing 0.446 g/m and having a density of 1.78 g/cm$^3$; 16) AS4D 12K is a 12,000 filament carbon fiber tow weighing 0.446 g/m and having a density of 1.79 gm$^3$; 17) IM9 12K is a 12,000 filament carbon fiber tow weighing 0.335 g/m and having a density of 1.80 g/cm$^3$; 16) IM10 12K is a 12,000 filament carbon fiber tow weighing 0.224 g/m and having a density of 1.79 gm$^3$.

The invention is particularly useful in the automotive industry where large amounts of highly reproducible preforms are required. Preferred UD tape fibers for automotive applications include large tow fibers, such as those containing 30,000-50,000 filaments.

The non-agglomerating composite chips 16 may be from 2 mm to 2 cm wide, 0.02 mm to 0.5 mm thick and from 1 cm to 10 cm long. The size of the chips 16 will depend upon the desired chip density in the prepreg, the size of the prepreg and the complexity of the three dimensional shape of the prepreg. The composite chips 16 are preferably rectangular in shape. However, other shapes are possible depending, upon the angles at which the UD tape is chopped. For denser chip packing in the prepreg, smaller chips are preferred. The smaller chip sizes are also preferred when making preforms that have complex three dimensional shapes.

Although the fibers are preferably in the form of a UD tape 12, it is possible to employ other fiber orientations to form a tape where the fibers are not unidirectional. There may be certain applications where woven fiber may be used in place of UD fibers. This presents some benefits for certain applications where impact resistance is important.

The uncured resin present in the UD tape 12 can be any of the uncured thermosetting resins that are combined with fibers to form molding compounds or preforms The uncured resin inherently causes the exposed surfaces of the composite chips 16 to be tacky at temperatures above $T_{tf}$ where they exhibit a degree of tack that is typically sufficient to cause the composite chips 16 to stick together or agglomerate. The degree of tack is the same as that required for chips used in forming DFC sheet molding compound. However, it is important that the initial temperature of the chips 16 be maintained below $T_tf$ in order to prevent premature agglomeration of the chips.

Although any number of inherently tacky uncured thermosetting resins may be used in the UD tape, epoxy resins are preferred. The tacky uncured thermosetting resin includes one or more epoxy resins and a curative for the epoxy resin(s). One or more resin modifiers may be added provided that the tackiness of the tacky uncured thermosetting resin is not reduced to a level below which cohesive preform formation is not possible. The uncured thermosetting resin should make up from 30 to 70 weight percent of the UD tape 12 and the non-agglomerating composite chips 16 with the remainder being UD fibers. Any of the commercially available epoxy resin formulations that are tacky at room temperature or slightly below room temperature are preferred for use as the uncured thermosetting resin.

Exemplary epoxy resins include any of the difunctional and/or multifunctional epoxy resins typically used in making prepreg. Examples of suitable difunctional epoxy resins include those based on: diglycidyl ether of Bisphenol F, Bisphenol A (optionally brominated), glycidyl ethers of phenol-aldelyde adducts, glycidyl ethers of aliphatic diols, diglycidyl ether, diethylene glycol diglycidyl ether, Epikote®, Epon®, aromatic epoxy resins, epoxidised olefins, brominated resins, aromatic glycidyl amines, heterocyclic glycidyl imidines and amides, glycidyl ethers, fluorinated epoxy resins, or any combination thereof. The difunctional epoxy resin is preferably selected from diglycidyl ether of Bisphenol F, diglycidyl ether of Bisphenol A, diglycidyl dihydroxy naphthalene, or any combination thereof. For example, diglycidyl ether of Bisphenol F is available commercially from Huntsman Advanced Materials (Brewster, N.Y.) under the trade names Araldite GY281 and GY285. A difunctional epoxy resin may be used alone or in any suitable combination with other difunctional epoxies or multifunctional epoxies.

Multifunctional epoxy resins are typically trifunctional or tetrafunctional. Suitable multifunctional epoxy resins, by way of example, include those based upon: phenol and cresol epoxy novolacs, glycidyl ethers of phenol-aldelyde adducts; glycidyl ethers of dialiphatic diols; diglycidyl ether; diethylene glycol diglycidyl ether; aromatic epoxy resins; dialiphatic triglycidyl ethers, aliphatic polyglycidyl ethers; epoxidised olefins; brominated resins; aromatic glycidyl amines; heterocyclic glycidyl imidines and amides; glycidyl ethers; fluorinated epoxy resins or any combination thereof.

Suitable trifunctional epoxy resins include those based upon: phenol and cresol epoxy novolacs; glycidyl ethers of phenol-aldelyde adducts; aromatic epoxy resins; dialiphatic triglycidyl ethers; aliphatic polyglycidyl ethers; epoxidised olefins; brominated resins, aromatic glycidyl amines and glycidyl ethers; heterocyclic glycidyl imidines and amides; glycidyl ethers; fluorinated epoxy resins or any combination thereof. Exemplary trifunctional epoxy resin are available commercially from Huntsman Advanced Materials (Monthey, Switzerland) as Araldite MY0500/0510 or Araldite MY0600/0610, and from Sumitomo Chemical Co. (Osaka, Japan) under the trade name ELM-120

Examples of suitable tetrafunctional epoxy resins include N,N,N',N'-tetraglycidyl-4,4'-diaminodiphenyl methane (TGDDM) available commercially as Araldite MY720 and MY721 from Huntsman Advanced Materials (Monthey, Switzerland), or ELM 434 from Sumitomo.

The curative that is included with the epoxy resin to form the tacky uncured thermosetting resin may be any of the curatives and curative combinations that are commonly used to cure epoxy resins. Curatives as used herein, includes both curing agents and accelerators.

Exemplary curing agents include polycarboxylic anhydrides, such as nadic anhydride (NA), methylnadic anhydride (MNA—available from Aldrich), phthalic anhydride, tetrahydrophthalic anhydride, hexahydrophthalic anhydride (HHPA—available from Anhydrides and Chemicals Inc., Newark, N.J.), methyltetrahydrophthalic anhydride (MTHPA—available from Anhydrides and Chemicals Inc.), methylhexahydrophthalic anhydride (MHHPA—available from Anhydrides and Chemicals Inc.), endomethylenetetrahydrophthalic anhydride, hexachloroendomethylene-tetrahydrophthalic anhydride (Chlorentic Anhydride—available from Velsicol Chemical Corporation, Rosemont, Ill.), trimellitic anhydride, pyromellitic dianhydride, maleic anhydride (MA—available from Aldrich), succinic anhydride (SA), nonenylsuccinic anhydride, dodecenylsuccinic anhydride (DDSA—available from Anhydrides and Chemicals Inc.), polysebacic polyanhydride, and polyazelaic polyanhydride.

Further suitable curing agents are the amines, including aromatic amines, e.g., 1,3-diaminobenzene, 1,4-diaminobenzene, 4,4'-diamino-diphenylmethane, and the polyaminosulphones, such as 4,4'-diaminodiphenyl sulphone (4,4'-DDS—available from Huntsman, 4-aminophenyl sulphone, and 3,3'-diaminodiphenyl sulphone (3,3'-DDS).

Also, suitable curing agents may include polyols, such as ethylene glycol (EG—available from Aldrich), poly(propylene glycol), and poly(vinyl alcohol); and the phenol-formaldehyde resins, such as the phenol-formaldehyde resin having an average molecular weight of about 550-650, the p-t-butylphenol-formaldehyde resin having an average molecular weight of about 600-700, and the p-n-octylphenol-formaldehyde resin, having an average molecular weight of about 1200-1400, these being available as HRJ 2210, HRJ-2255, and SP-1068, respectively, from Schenectady Chemicals, Inc., Schenectady, N.Y.). Further as to phenol-formaldehyde resins, a combination of CTU guanamine, and phenol-formaldehyde resin having a molecular weight of 398, which is commercially available as CG-125 from Ajinomoto USA Inc. (Teaneck, N.J.), is also suitable.

Different commercially available compositions may be present as curing agent(s) in the tacky uncured thermosetting resin. One such composition is AH-154, a dicyandiamide type formulation, available from Ajinomoto USA Inc. Others which are suitable include Ancamide 400, which is a mixture of polyamide, diethyltriamine, and triethylenetetraamine, Ancamide 506, which is a mixture of amidoamine, imidazoline, and tetraethylenepentaamine, and Ancamide 1284, which is a mixture of 4,4'-methylenedianiline and 1,3-benzenediamine; these formulations are available from Pacific Anchor Chemical, Performance Chemical Division, Air Products and Chemicals, Inc., Allentown, Pa.

Additional suitable curing agents include imidazole (1,3-diaza-2,4-cyclopentadiene) available from Sigma Aldrich (St. Louis, Mo.), 2-ethyl-4-methylimidazole available from Sigma Aldrich, and boron trifluoride amine complexes, such as Anchor 1170, available from Air Products & Chemicals, Inc.

Still additional suitable curing agents include 3,9-bis(3-aminopropyl-2,4,8,10-tetroxaspiro[5.5]undecane, which is commercially available as ATU, from Ajinomoto USA Inc., as well as aliphatic dihydrazide, which is commercially available as Ajicure UDH, also from Ajinomoto USA Inc., and mercapto-terminated polysulphide which is commercially available as LP540, from Morton International, Inc., Chicago, Ill.

Exemplary accelerators that may be present as part of the curative in the tacky uncured thermosetting resin include any of the urone compounds that have been commonly used as accelerators, such as N,N-dimethyl, N'-3,4-dichlorphenyl urea (Diuron), N'-3-chlorophenyl urea (Monuron), and N,N-(4-methyl-m-phenylene bis[N',N'-dimethylurea] (e.g. Dyhard UR500 available from Degussa).

Modifiers may be present hi the tacky uncured thermosetting resin. Exemplary modifiers include thermoplastic materials used to toughen the epoxy resin. Such thermoplastics may be soluble in the epoxy resin, such as polyether sulphone or polyetherimide. Insoluble thermoplastic particles, such as polyamide, polyamideimide and polyurethane, may also be included as a modifier.

Additional exemplary modifiers that may be present in the tacky uncured thermosetting resin include flexibilizers, core shell rubbers, flame retardants, wetting agents, pigments/dyes, UV absorbers, anti-fungal compounds, fillers, conducting particles, and viscosity modifiers. Suitable fillers include, by way of example, any of the following either alone or in combination: silica, alumina, titania, glass, calcium carbonate and calcium oxide. The amount and type of modifier is limited so that the inherently tacky nature of the tacky uncured thermosetting resin is not eliminated or reduced substantially.

For automotive applications, which typically involve high volumes, relatively fast curing epoxy resins are preferred. Such resins typically include Bis A or Bis F epoxy resin as the main ingredient with dicyandiamide being used as the principal curative.

The tack exhibited by the surfaces of the non-agglomerating composite chips 16 can be increased by increasing the temperature of the uncured thermosetting resin. Increasing the chip temperature has a direct effect on the surface tack of chips. The surfaces of composite chips exhibit a higher degree of tack at higher temperatures and tend to exhibit less tack when kept at lower temperatures. The composite chips 16 are kept at an initial temperature $T_i$ where the surfaces of the composite chips are essentially tack-free so that the composite chips 16 do not agglomerate when contacted with each other. A preliminary test to determine a suitable $T_i$ for a particular uncured thermosetting resin may be accomplished by placing a group of the composite chips 16 in a bag at the selected $T_i$ and shaking it for a few (5-10) seconds. If numerous agglomerates of chips form, then the surfaces are exhibiting too much tack. The $T_i$ is reduced until only minor amounts (less than 5% by weight) of the chips form agglomerates during the shake test.

Some heating of the composite chips 16 may occur during chopping and handling. If necessary the non-agglomerating chips 16 are cooled in cooling zone 18 to ensure that they remain at or below the tack-free temperature $T_{tf}$ for a given thermosetting resin. At $T_{tf}$ the tacky composite chips 16 can be formed into a stream of non-agglomerating composite chips. $T_{tf}$ can be preliminarily determined by placing a group of the cooled composite chips in a bag and shaking it for a few seconds. If any agglomerates of chips form, then the chips are not cold enough to be non-agglomerating and $T_{tf}$ has not been reached. $T_{tf}$ is reached when the cooled tacky composite chips fail to agglomerate (less than 5% by weight agglomerate formation) when shaken together in a bag for a few seconds (5-10 seconds). It is preferred that the temperature $T_i$ of the composite chips 16 be kept at a few degrees below $T_{tf}$ in order to ensure that the chips do not agglomerate. The temperature should not be so low that the uncured thermosetting resin becomes powdery. For many epoxy resins, the $T_{tf}$ will range from 0° C. to 25° C.

As an example, composite chips that include diglycidyl ether of bisphenol A as the epoxy resin and dicyandiamide as a curing agent are formed at a $T_i$ of 10° C. to 20° C. in order to provide non-agglomerating composite chips 16 that are at least a few degrees below the $T_{tf}$ for the particular uncured epoxy resin. The chips 16 are cooled, if necessary, in cooling zone 18 to maintain the temperature of the composite chips 16 at the $T_i$ of between 10° C. to 20° C. in order to ensure that the composite chips 16 remain non-agglomerating. It is preferred that the uncured resin have a $T_{tf}$ that is at or close to the temperature of the room (15° C. to 25° C.) in order to eliminate the need to expend energy by keeping the chips refrigerated. It is preferred that the Composite chips 16 be used immediately after they are formed. However the chips 16 may be stored prior to use for relatively short periods of time (e.g. less than 24 hours) provided that the temperature is kept at or below $T_{tf}$.

The non-agglomerating composite chips are passed from the cooling zone 18 into funnel 20 Where they form a stream of non-agglomerating composite chips. The stream is directed by funnel 20 into a preform tool 22 at filling station A. Apparatus, other than a funnel, may be used to direct the stream of non-agglomerating chips into the preform tool 22. The chips 16 may be randomly oriented as they pass through the funnel 20. The funnel 20 can include vanes or other internal structures that orient or align the chips 16 into a desired configuration as they pass through the funnel 20

As indicated by arrow 24, the method is intended to be a mass production method in which multiple preform tools (e.g. 22a and 22b) are lined up for filing with non-agglomerating composite chips at filling station A. Multiple filling stations A may be used so that the preform tool 22 can be filled with more than one type of non-agglomerating composite chip. The ability to use multiple filling stations to form preforms that contain multiple types of composite chips at different locations and/or orientations within the preform is advantageous when making complex preforms that have complex performance requirements.

The preform tools include a cavity 26 that is formed by an interior wall 28 and bottom surface 30. The wall 28 and bottom surface 30 define and eventually form exterior surfaces of the final preform. The stream of non-agglomerating composite chips is used to fill the cavity 26 and form a population of non-cohesive composite chips 31. It is preferred that the preform tool 22 is vibrated by a vibrator platform 34 in order to help settle and pack the non-agglomerating composite chips in the cavity 26 in order to control the distribution and random orientation of the non-cohesive composite chips. Preferably, the preform tool will be vibrated a sufficient amount to produce as uniform a top surface of the preform as possible. A vacuum may be applied to the cavity 26 in order to also help in controlling and/or maximizing the distribution of the non-agglomerating composite chips within the cavity 26. A scale (not shown) is used to measure and control the weight of non-agglomerating composite chips that are introduced into the cavity. The non-agglomerating composite chips form a population of non-cohesive composite chips once they are inside the cavity. The use of a scale ensures that the Smile amount of chips are introduced into each cavity, which in turn ensures the formation of preforms having uniform dimensions.

The filled preform tools 22c, 22d and 22e, which are filled with populations of non-cohesive composite chips 32c, 32d and 32e, respectively, are passed to a consolidation station B. The preform tools are preferably allowed to warm up to room temperature during the transfer from filling station A to consolidation station B or while in station B. Room temperature must be above $T_{tf}$ for the composite chips so that the tack-free composite chips become tacky or sticky. In effect, the non-tacky uncured thermosetting resin present in the non-agglomerating composite chips is converted into a sticky uncured thermosetting resin. The sticky uncured thermosetting resin is formed by increasing the temperature and inherent stickiness of the non-sticky uncured thermosetting resin that is present in the population of non-cohesive composite chips 32c, 32d and 32e In consolidation station B, the population of iron-cohesive composite chips are formed by a debulking and consolidation apparatus 36 using heat and either vacuum or pressure to form the preform in as little time as possible (e.g. a few seconds) The preform is composed of a consolidated population of cohesive composite chips.

It is preferred that the $T_{tf}$ for a particular composite chip be close to the temperature of the room in order to reduce the amount of energy that is needed to keep the UD tape 12 and composite chips 16 cold enough for formation of a non-agglomerating stream of composite chips. For any given type of composite chips, it is preferred that the chips are first tested, as discussed above, to make sure that the chips agglomerate at the temperature of the room in which the method is carried out (e.g. 20° C.). This insures that the temperature of the room where the method is carried out is acceptable for forming the preforms. The chips are then tested at lower and lower temperatures to determine the temperature $T_{tf}$ at which the tacky composite chips become non-agglomerating composite chips. This $T_{tf}$ is used as the preferred $T_i$ because it requires the minimum amount of cooling in order to ensure that the otherwise tacky composite chips are non-agglomerating composite chips. The difference between room temperature and the preferred $T_{tf}$ is preferably on the order of 1° C. to 10° C. It should be noted that $T_{tf}$ is an inherent property of the composite chip which is determined as set forth above, whereas $T_i$ is the chosen temperature at which the composite chips are formed and introduced into the preform. $T_i$ must be equal to or below $T_{tf}$.

The debulking and consolidation apparatus 36 that is used to form the preform is a typical low pressure or vacuum mold apparatus that is used in forming sheet molding compound into a preform without curing, the sticky uncured thermosetting resin. The preform tool 22 forms the bottom of apparatus 36 with the top being formed by a re-usable vacuum bag apparatus that seals to the preform tool or a plunger that applies pressure to the top of the tacky composite chips. Another option is to use a hard shell as the top which is sealed by a bladder or hydraulic pressure. Typically, a vacuum or equivalent pressure of from 5 to 15 psi is applied to the cavity during consolidation to from the preform.

If desired, the preform can be "B-staged" while being present in the debulking and consolidation apparatus 36. B-staging is a known partial curing procedure that involves heating the preform at ambient pressure to a temperature of, for example 165° C. to 180° C., for just enough time to substantially increase the viscosity of the sticky uncured thermosetting resin. Exemplary B-staging times are on the order of 5 to 15 minutes at the B-staging temperature. The B-staged preform is cooled to room temperature either before or after being removed from the debulking and consolidation apparatus 36.

The surface of the debulking and consolidation apparatus 36 and surfaces of the preform tool 28 and 30 typically do not need to be treated with a release agent. However, if desired, the surfaces may be treated with a release agent to ensure that the preform does not stick to these surfaces. Any release agent that is typically used on the surfaces of preform tooling or molds are suitable. Exemplary release agents include silicone-based release agents and water-based release agents. Tool surfaces coated with polytetrafluoroethylene or re-useable release films are also suitable.

After formation in debulking and consolidation apparatus 36, the preform 32f is removed from the preform tool 22f. The preform 32f may transferred for immediate molding to form the final part or it can be stored for molding at a later date. As represented by arrow 38, the emptied preform tool 22g is recycled back to filling station A for re-filling and reuse to form additional preforms.

Molding of the preform 32f is accomplished in the same manner as molding of any preform that contains fibers and an uncured thermosetting resin. Any of the molding processes that are used to mold preforms that contain DFC sheet molding compound may be used for molding of preform 32f. It is preferred that the preform 32f be compression molded according to known compression molding procedures for DFC sheet molding compound. For example, the preform is placed in a mold that is typically composed of two mold halves that form a cavity that matches the shape of the preform. Once in the mold, the preform is heated to the curing temperature of the sticky uncured thermosetting resin and molded at high pressure to form the final part. Typical high-pressure curing temperatures for epoxy resins range from 120° C. to 225° C., Preferred curing temperatures range from 120° C. to 205° C. Internal pressures within the mold are preferably above 500 psi and below 2000 psi at the cure temperatures. Once the prepreg has been completely cured (typically 5 minutes to 1 hour at curing temperature), the part is removed from the mold and cooled to form the final part.

The above described exemplary method utilizes temperature to convert the population of non-cohesive composite chips into a preform that is composed of a consolidated population of cohesive composite chips. In such a thermally based method, it is necessary that the uncured thermosetting resin that is present in the non-agglomerating composite chips be able to go from being tack-free at $T_i$, which is preferably slightly below the room temperature, to exhibiting tack when heated up to the room temperature, which is above $T_{tf}$, as it moves to consolidation station B. Thermosetting resins that cannot meet this criteria are not suitable for use in this preferred embodiment of the invention.

Figure 2:
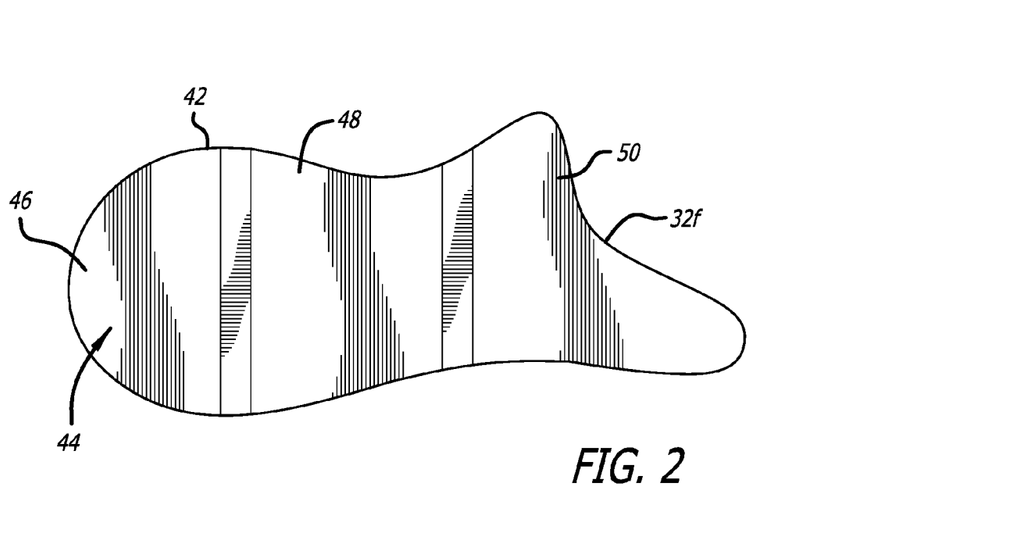
FIG. 2 is a top view of an exemplary preform made according to the exemplary method shown in FIG. 1.
Figure 3:
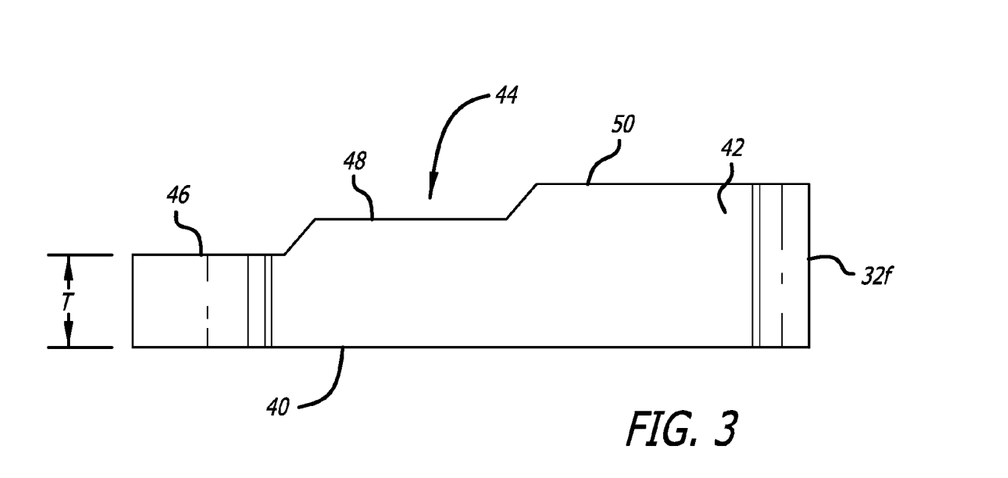
FIG. 3 is a side view of the exemplary preform shown in FIG. 2

A bottom view of exemplary preform 32f is shown in FIG. 2 and a side view is shown in FIG. 3. The preform 32f includes a top surface 40 that is formed during debulking and consolidation The preform 32f also has a side surface 42 that is defined and formed by the wall 28 of the preform tool. The preform 32f further includes a bottomsurface 44 that is formed by the bottom surface of the preform tool. The bottom surface 44 is contoured to form three surface sections 46, 48 and 50. The thickness of the preform 32f between surface section 46 and top surface 40 is "T". The thickness of the preform 32f between surface section 48 and top surface 40 is equal to $T+\frac{3}{8} \times T$. The thickness of the preform 32f between surface section 50 and top surface 40 is equal to $T+\frac{3}{8} \times T \div \frac{5}{8} \times T$.

Preforms like 32f, which have contoured surfaces, can be made using DFC sheet molding compound. The DFC sheet molding compound can be used as a single ply or multiple plies to form a section of the preform having a thickness T. However, in forming additional sections of the preform that have fractional increases in thickness T, one must consider using other DFC sheet molding compounds that have different thicknesses and which must be layered over each other. The present invention avoids these issues associated with the use of DFC sheet molding compound to form contoured surfaces, like bottom surface 44, because the composite chips are used to directly fill the preform cavity rather than to forum a sheet molding compound that must then be layered and formed into the preform.

In addition, if the part to be molded has sections that are thinner than the DFC sheet molding compound, then the DFC sheet molding compound must be compressed during molding so that it flows to form the thinner part. This type of material flow during molding can have negative effects on the mechanical properties of the part and tends to increase property variations from part to part. The present invention avoids this problem because the non-agglomerating chips can be formed directly into vet thin preform sections that are much thinner than the thickness of a sheet of DFC molding compound. The thickness of parts made in accordance with the invention is only limited by the thickness of the individual chips.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. A method for making a preform comprising a consolidated population of cohesive composite chips wherein said preform comprises an exterior surface which forms the surface of a composite part upon molding of said preform, said method comprising the steps of:
    providing non-agglomerating, composite chips, said non-agglomerating composite chips each comprising fibers and an uncured thermosetting resin wherein the non-agglomerating composite chips are at a temperature such that the tackiness of said uncured thermosetting resin is sufficiently low to prevent agglomeration of said non-agglomerating composite chips;
    forming a stream comprising said non-agglomerating composite chips;
    providing a preform tool which comprises walls that form a cavity for receiving said stream of non-agglomerating composite chips, wherein at least one of said walls defines said exterior surface of the preform;
    directing said stream of non-agglomerating, composite chips to said preform tool order to fill said cavity with a population of non-cohesive composite chips;
    increasing the temperature of said population of non-cohesive composite chips to form said preform comprising a consolidated population of cohesive composite chips wherein said cohesive composite chips each comprises said fibers and said uncured thermosetting resin wherein said cohesive composite chips are at a temperature such that the tackiness of said uncured thermosetting resin is sufficiently high to cause cohesion of said cohesive composite chips to form said preform; and
    removing said preform from said preform tool.

2. A method for making a preform according to claim 1 wherein said fibers in said non-agglomerating composite chips are unidirectional.

3. A method for making a preform according to claim 1 wherein said non-agglomerating composite chips have a length of from 1 cm to 10 cm, a width of from 2 min to 2 cm and a. thickness of from 0.02 mm to 0.50 mm.

4. A method for making a preform according to claim 1 wherein said non-agglomerating composite chips are rectangular in shape.

5. A method for making a preform according to claim 1 wherein said uncured thermosetting resin comprises an epoxy resin.

6. A method for making a preform according to claim 5 wherein said non-agglomerating composite chips are at a temperature of between 0° C. and 25° C.

7. A method for making a preform according to claim 1 wherein said non-agglomerating composite chips are at a temperature of between 10° C. and 20° C.

8. A method for making a preform according to claim 1 wherein the preform tool is vibrated during filling of said cavity with said population of non-cohesive composite chips.

9. A method for making a preform according to claim 1 wherein said population of non-cohesive composite chips is weighed during filling of said cavity.

10. A method for making a preform according to claim 9 wherein said preform tool is vibrated during filling of said cavity with said non-agglomerating composite chips.

11. A method for making a preform according to claim 1 wherein a vacuum is applied to the cavity in said preform tool during filling of said cavity with said non-agglomerating composite chips to form said population of non-cohesive chips.

12. A method for making a preform according to claim 8 wherein a vacuum is applied to the cavity in said preform tool during, filling of said cavity with said non-agglomerating composite chips to form said population of non-cohesive chips.

13. A method for making a preform according to claim 1 wherein a vacuum is applied to the cavity in said preform tool during the step of forming said preform.

14. A method for making a preform according to claim 8 wherein a vacuum is applied to the cavity in said preform tool during the step of forming said preform.

15. A method for making a preform according to claim 1 wherein the exterior surface of said preform is contoured so that that preform has a first portion that is thicker than a second portion of said preform.

16. A method for making a composite part comprising the steps of providing a preform made according to claim 1 and curing said uncured thermosetting resin to form said composite part.

\* \* \* \* \*

UNITED STATES PATENT AND TRADEMARK OFFICE
CERTIFICATE OF CORRECTION

PATENT NO.         : 9,724,854 B2                                  Page 1 of 1
APPLICATION NO.    : 14/711087
DATED              : August 8, 2017
INVENTOR(S)        : Bruno Boursier It is certified that error appears in the above-identified patent and that said Letters Patent is hereby corrected as shown below:

In the Claims

In Claim 1, Column 12, Line 36, --in-- should be inserted after "tool".

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*